US009179266B2

(12) United States Patent
Kelly

(10) Patent No.: US 9,179,266 B2
(45) Date of Patent: Nov. 3, 2015

(54) AUGMENTATION OF INDOOR NAVIGATION METHODS AND APPARATUS WITH MAP MATCHING CONSTRAINTS

(71) Applicant: mCube, Incorporated, San Jose, CA (US)

(72) Inventor: Joseph M. Kelly, Center Point, IA (US)

(73) Assignee: mCube Inc., San Jose, CA (US)

( * ) Notice: Subject to any disclaimer, the term of this patent is extended or adjusted under 35 U.S.C. 154(b) by 317 days.

(21) Appl. No.: 13/804,944

(22) Filed: Mar. 14, 2013

(65) Prior Publication Data

US 2013/0244691 A1  Sep. 19, 2013

Related U.S. Application Data

(60) Provisional application No. 61/612,250, filed on Mar. 17, 2012.

(51) Int. Cl.
*H04W 24/00* (2009.01)
*H04W 4/04* (2009.01)

(52) U.S. Cl.
CPC .................................. *H04W 4/043* (2013.01)

(58) Field of Classification Search
CPC ......... H04W 64/00; H04W 4/02; H04W 4/04; G01C 21/206
USPC ........................................ 455/456.1; 701/434
See application file for complete search history.

(56) References Cited

U.S. PATENT DOCUMENTS

2011/0307171 A1* 12/2011 Waite .......................... 701/208
2012/0203453 A1*  8/2012 Lundquist et al. ............ 701/434

* cited by examiner

*Primary Examiner* — Omoniyi Obayanju
(74) *Attorney, Agent, or Firm* — Kilpatrick Townsend and Stockton LLP

(57) ABSTRACT

A computer-implemented method for determining an estimated user location, implemented in a computing system programmed to perform the method includes receiving a map database associated with a geographic location including a plurality of map features, determining an estimated first user location within the geographic location, receiving a first plurality of physical perturbations from a plurality of physical sensors in response to physical perturbations of the computing system, determining an estimated second user location within the geographic location in response to the estimated first user location and to the first plurality of physical perturbations, determining a modified estimated second user location in response to the estimated second user location and to at least one map feature from the plurality of map features, and providing in the computer system, an indication of the modified estimated second user location with regards to the geographic location.

20 Claims, 3 Drawing Sheets

AUGMENTATION OF INDOOR NAVIGATION METHODS AND APPARATUS WITH MAP MATCHING CONSTRAINTS

CROSS-REFERENCE TO RELATED APPLICATIONS

The present invention claims priority to and is a non-provisional of U.S. Ser. No. 61/612,250 filed Mar. 17, 2012 that is incorporated by reference herein, for all purposes.

BACKGROUND

The present invention relates to mobile devices. More specifically, embodiments of the present invention relate to using map-based constraints to augment indoor navigation and positioning methods and apparatus.

The recognition of a user's state in mobile devices has previously been previously accomplished through the use of discrete motion detectors. The motions sensed by these detectors are typically compared against characteristic thresholds with regard to direction, sign, and magnitude of the sensed force or rotation for each detector.

The inventors of the present invention have determined that problems with these type of detection methods include that sensor events that are detected are often handled as disparate events. Because of this, it is difficult to determine occurrence of complex events.

In light of the above, it is desired to have portable navigation systems with increased detection of more complex events without the drawbacks described above.

BRIEF SUMMARY OF THE INVENTION

The present invention relates to mobile devices. More specifically, embodiments of the present invention relate to using map-based constraints to augment indoor navigation and positioning methods and apparatus.

In various embodiments physical objects represented by maps may be used as constraints to help limit the growth of errors in user position (and heading) estimates in a navigation system. More particularly, in some embodiments, positions of walls, corridors, doors, and the like in an indoor map may be used to constrain a user position (and heading) estimated by a dead-reckoning positioning and/or navigation system. Embodiments treat map data as a source of complementary data that can be intelligently blended with inertial and other dead reckoning navigation sources by properly incorporating the map-based complementary data when it is useful to do so.

In some embodiments physical objects represented by maps may be selectively used as constraints to help limit the growth of errors in user position estimates in a navigation system. For example, in addition to the above, in some embodiments, when the user position estimates are within rooms, open regions, wide corridors, or the like, the calculated constraints based upon maps may be deemphasized or ignored when determining a user position estimated by a dead-reckoning positioning and/navigation system.

According to one aspect of the invention, a computer-implemented method for determining an estimated user location, implemented in a computing system programmed to perform the method is described. One technique includes receiving in the computer system, a map database associated with a geographic location including a plurality of map features, determining in the computer system, an estimated first user location within the geographic location, and receiving in the computer system, a first plurality of physical perturbations from a plurality of physical sensors in response to physical perturbations of the computing system. A process may include determining in the computer system, an estimated second user location within the geographic location in response to the first user location and to the first plurality of physical perturbations, determining in the computer system, a modified estimated second user location in response to the estimated second user location and to at least one map feature from the plurality of map features, and providing in the computer system, an indication of the modified estimated second user location with regards to the geographic location.

According to another aspect of the invention, a computer system programmed to determine an estimated user location is described. A device includes a memory for storing a map database associated with a geographic location including a plurality of map features, and for storing an estimated first user location within the geographic location. An apparatus includes a plurality of physical sensors for receiving physical perturbations of the computing system, and for determining a first plurality of physical perturbations in response to physical perturbations of the computing system. A system includes a processor coupled to the memory and the plurality of physical sensors, wherein the processor is programmed for determining an estimated second user location within the geographic location in response to the estimated first user location and to the first plurality of physical perturbations, wherein the processor is programmed for determining a modified estimated second user location in response to the estimated second user location and to at least one map feature from the plurality of map features, and wherein the processor is programmed for indicating the modified estimated second user location with regards to the geographic location.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Various embodiments of the present invention are directed towards user navigation and/or guidance within an indoor location. More specifically, various embodiments utilize indoor map-based features to constrain or adjust a predicted or estimated user location that is based upon dead-reckoning, or the like.

Figure 1:
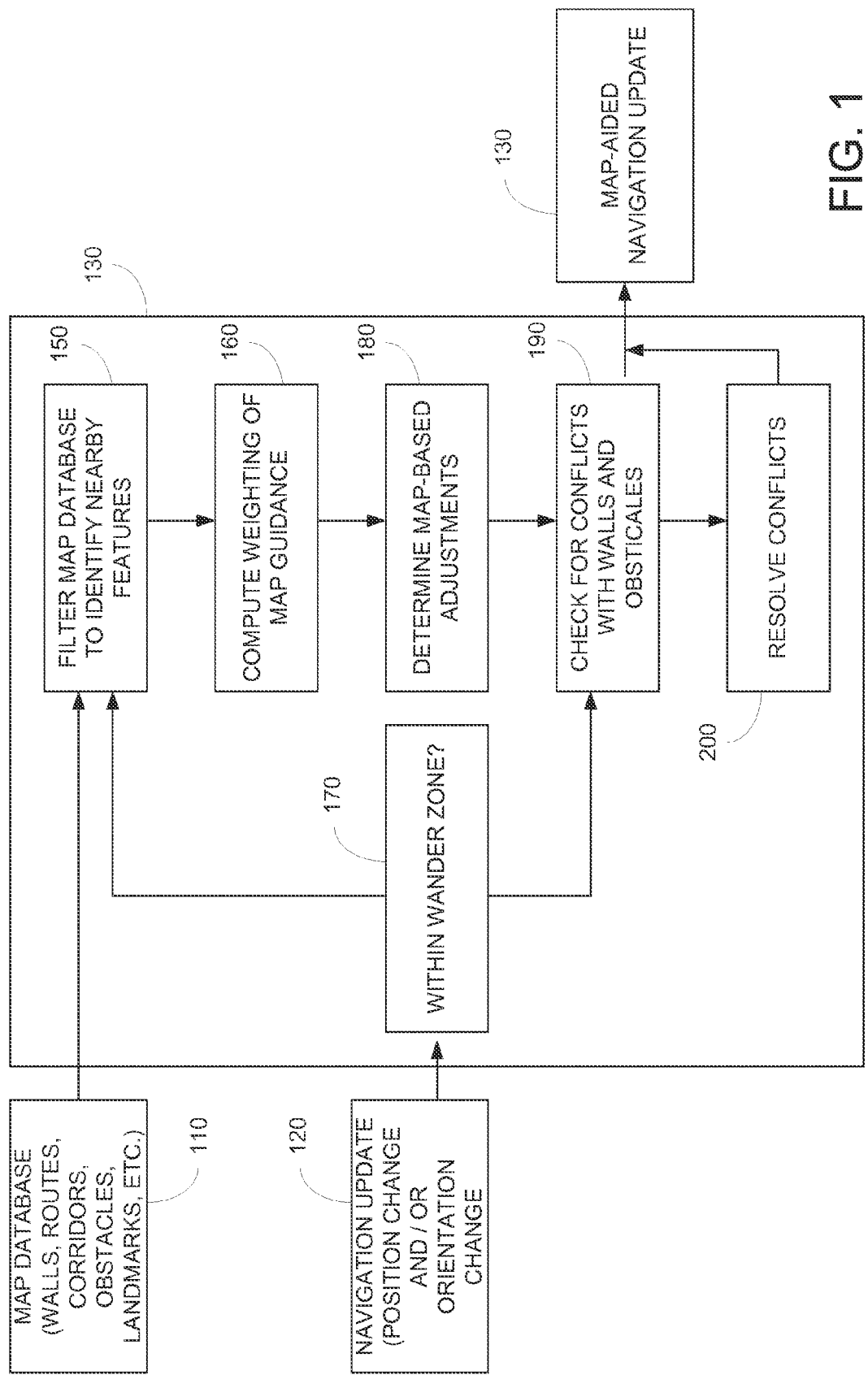
FIG. 1 illustrates an embodiment of the present invention.

FIG. 1 illustrates an implementation of a logical block diagram according to some embodiments of the present invention. FIG. 1 includes a data store 110, a physical input 120, a processing module 130, and a navigation output 140.

In various embodiments, data store 110 may be implemented as a database, a file system, or any other conventional data store. Data store 110 may be embodied within memory of a portable device (e.g. RAM, SD card, etc.), as a network-based storage external to the portable device (e.g. cloud storage, network storage, or the like.

In various embodiments, data store 110 may store one or more maps representing an indoor location, e.g. a mall, a store, a factory, or the like. The map data typically indicate open regions, e.g. corridors, rooms, etc, as well as physical partitions, e.g. walls, doors, stairwell, and the like. In various embodiments, queries may be made upon data store 110, and map data may be returned for purposes of indoor navigation, as described herein.

In various embodiments, physical input 120 may include data representing physical perturbations imparted to a portable device, as described herein. In some examples, the physical perturbations include directional acceleration as determined by one or more accelerometers; directional rotation as determined by one or more gyroscopes; directional magnetic orientation changes determined by one or more magnetometers; altitude changes determined by one or more pressure sensors; or the like. In some embodiments, these types of physical perturbation sensors may be included within a portable device (e.g. a cell phone), or located external to the portable device, but linked (e.g. wires, Bluetooth, Wi-Fi, or the like) to the portable device. In the embodiment illustrated in FIG. 1, the sensed physical perturbations may be provided as physical input 120, and/or be signal processed and conditioned, before being provided as physical input 120. In other embodiments, additional processing may be performed to determine an estimated position and/or heading of the physical device including the functionality described herein.

In FIG. 1, a processing module 130 is illustrated. In various embodiments, module 130 may be implemented as one or more software programs or functions executed upon one or more microprocessors in the portable device. As illustrated, a navigation output 140 is provided as an output from processing module 130 and may be a map-data-modified user location within the indoor location, or the like, as described below.

As illustrated in the example in FIG. 1, processing module 130 includes an identification module 150, a weighting module 160, a zone module 170, a adjustment module 180, a conflict determination module 190, and optionally, a conflict resolution module 200. In some embodiments, a subset of modules may be used, or additional functional modules may be provided.

In various embodiments, based upon an initial user location within a map, identification module 150 may access data store 110 to determine what map-based features are physically close to the initial user location (estimated user position and/or heading). As mentioned above, the identified map-based features may include walls, corridors, intersections, doors, stairs, exits, shops, kiosks, or the like.

In various embodiments, zone module 170 receives physical input 120 from one or more physical perturbation sensors. In various embodiments, based upon physical input 120, a general determination is made as to whether the user is positioned within large rooms, auditoriums, gymnasiums, atriums, lobbies, open spaces, or the like within the map. In such embodiments, for map guidance purposes, there are many possible routes a user may take through such open air regions, accordingly when a user is with such regions, the map-based augmentation may be deemphasized. In various embodiments, when zone module 170 determines the user is within such "wander zones," zone module 170 may direct other modules to not augment the user estimated position. For instance, zone module 170 may indicate to weighting module 160 to not assign weights to map features, may indicate to conflict determination module 190 to not return conflicts, or the like, as discussed below.

In various embodiments, in weighting module 160, weights may be dynamically assigned to specific map features close to a user's estimated position within a map. As examples, a corridor where a user is currently estimated to be within is given a higher weight compared to corridors further away to where the user is estimated to be currently positioned. In some embodiments, if the user is using a guidance or navigation mode, corridors, halls, doors, stairs, or the like along a suggested navigation path may also be associated with a higher weight compared to equally distant map features not along the suggested navigation path.

In some embodiments, based upon the user's estimated position with a map and the weightings determined in weighting module 160, a map-based adjustment, illustrated in examples below, are determined in adjustment module 180. In some examples, the adjustments may suggest a correction to the user's estimate position from an edge of a hallway towards the middle of the hallway; the adjustments may suggest a correction to the user's estimated heading from a first direction, e.g. north east, to a second direction, e.g. east; or the like.

In some embodiments, an estimated user position (even after adjustment, above) may conflict with specific map features and require resolution. In conflict determination module 190, the estimated user position (after adjustment) is compared to known map features or obstacles, e.g. walls, pillars, built-in furniture, or the like to see if they overlap. As examples, the estimated user position may be within a wall, outside a building, or the like. If such a conflict is determined, in various embodiments, conflict resolution module 200 typically modifies the estimated user position to eliminate the conflict. This may include modifying the user position to be within a corridor, along a navigation path, or the like.

As illustrated in FIG. 1, after augmentation due to map-based weighting and/or map-based conflict resolution, an estimated user position is output as navigation output 140.

Figure 2:
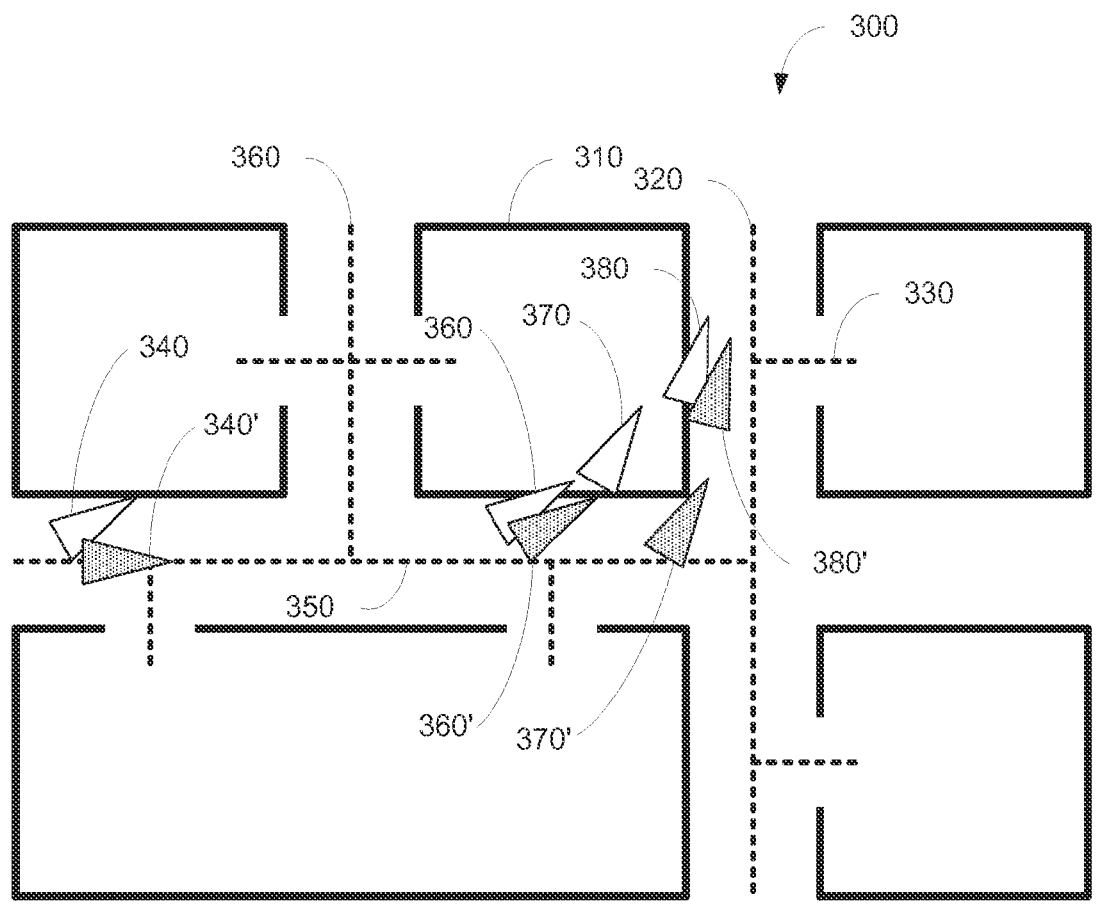
FIG. 2 illustrate an example according to embodiments of the present invention.

FIG. 2 illustrates an example according to various embodiments of the present invention. More specifically, FIG. 2 illustrates an example of map-based augmentation of a user's estimated position and heading.

In FIG. 2, an example of a map 300 is illustrated including a number of walls 310, corridors 320, doors 320. In various embodiments, as described above, dead reckoning data, or the like may be used to determine an estimated user position within a map. This estimated position may then be blended with map-based features. In various embodiments, these map-based updates may be used to logically constrain the estimated user positions to locations that make sense within the context of a map. In other words, it makes logical sense that the user is walking into a meeting room rather than walking into a broom closet.

As discussed above, in some embodiments, based upon an estimated position 340, corridors 350 and 360 may have weights assigned thereto. Each candidate corridor would have a certain level of attraction that would pull the estimated position 340 toward it. In this example, as corridor 350 is closer or more closely aligned to estimated position 340, the estimated position 340 may be modified to position 340'. In various examples, the estimated user positions may be drawn towards the middle of the pre-determined corridors, or the like.

In various embodiments, modification of an estimate user heading may also be performed. For example, if a user is walking down a straight narrow corridor, the estimated user heading may be heavily constrained to face down the hallway, however if the user is walking in an area with many turns, the estimated user heading may be less constrained. In an implementation, in areas with long straight corridors, or the like, the map-based heading constraints that may have a heavier weight compared to areas with many turns.

In FIG. 2, examples of constraint resolution are also illustrated. In FIG. 2, estimated user positions (and headings) 360, 370, and 380 are shown. In map 300, these estimated user positions (and headings) indicate that the user is walking through a solid internal wall 390. In various embodiments, as was discussed above, each of these positions 360-370 are compared to map features within a conflict determination module 190, which determines the conflicts with wall 390. Accordingly, conflict resolution module 200 modifies each estimated user positions 360-380 to positions within map 300 that make more logical sense, e.g. modified positions 360', 370' and 380', respectively.

In some embodiments of the present invention, the navigation output 140 (e.g. the modified estimated user location) may be fed-back into processing module 130 to help refine modifications to the estimated user locations. In other embodiments, such a feedback loop may not be needed. In some embodiments, feedback may be in the form of the user indicating that they reached a destination, the user taking a picture, a portable device sensing of other signals (e.g. Wi-Fi signals, Bluetooth signals, RF signals, NFC signals, or the like).

Figure 3:
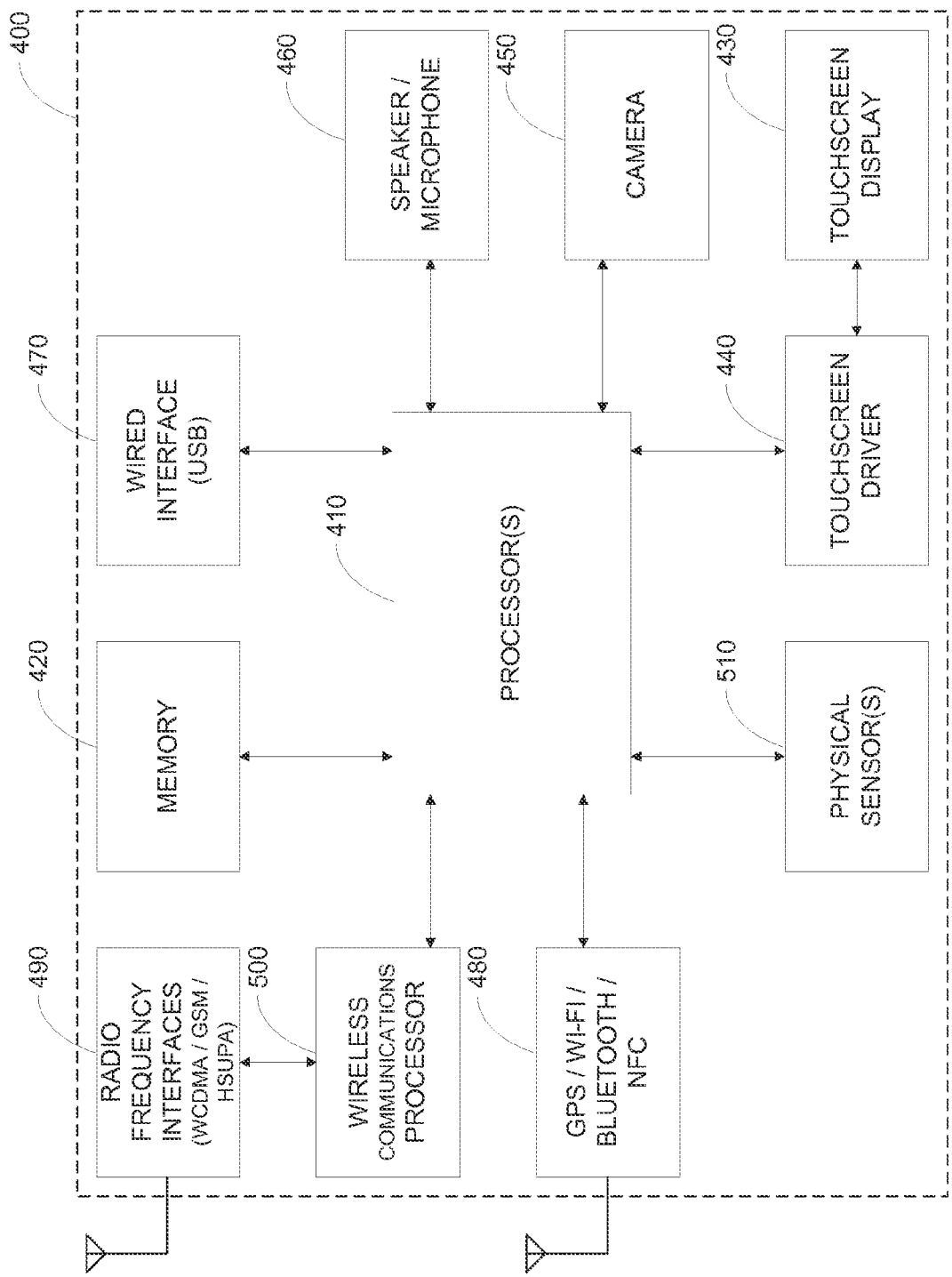
FIG. 3 illustrates a block diagram of a system according to some embodiments of the present invention.

FIG. 3 illustrates a functional block diagram of various embodiments of the present invention. In FIG. 3, a computing device 400 typically includes an applications processor 410, memory 420, a touch screen display 430 and driver 440, an image acquisition device 450, audio input/output devices 460, and the like. Additional communications from and to computing device are typically provided by via a wired interface 470, a GPS/Wi-Fi/Bluetooth interface 480, RF interfaces 490 and driver 500, and the like. Also included in various embodiments are physical sensors 510.

In various embodiments, computing device 400 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus series, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 400 may include one or more processors 410. Such processors 410 may also be termed application processors, and may include a processor core, a video/graphics core, and other cores. Processors 410 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 420 may include different types of memory (including memory controllers), such as flash memory (e.g. NOR, NAND), pseudo SRAM, DDR SDRAM, or the like. Memory 420 may be fixed within computing device 400 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 430 and driver 440 may be based upon a variety of later-developed or current touch screen technology including resistive displays, capacitive displays, optical sensor displays, electromagnetic resonance, or the like. Additionally, touch screen display 430 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 450 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 460 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 410 to enable the user to operate computing device 400 by stating voice commands. Additionally, a speech engine may be provided in various embodiments to enable computing device 400 to provide audio status messages, audio response messages, or the like.

In various embodiments, wired interface 470 may be used to provide data transfers between computing device 400 and an external source, such as a computer, a remote server, a storage network, another computing device 400, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 480 may also be provided to provide wireless data transfers between computing device 400 and external sources, such as computers, storage networks, headphones, microphones, cameras, or the like. As illustrated in FIG. 3, wireless protocols may include Wi-Fi (e.g. IEEE 802.11a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 480 merely for sake of convenience, although in implementation, such functionality is currently performed by circuitry that is distinct from the Wi-Fi circuitry and distinct from the Bluetooth circuitry.

Additional wireless communications may be provided via RF interfaces 490 and drivers 500 in various embodiments. In various embodiments, RF interfaces 490 may support any future-developed or conventional radio frequency communications protocol, such as CDMA-based protocols (e.g. WCDMA), GSM-based protocols, HSUPA-based protocols, or the like. In the embodiments illustrated, driver 500 is illustrated as being distinct from applications processor 410. However, in some embodiments, these functionality are provided upon a single IC package, for example the Marvel PXA330 processor, and the like. It is contemplated that some embodiments of computing device 400 need not include the RF functionality provided by RF interface 490 and driver 500.

FIG. 3 also illustrates computing device 400 to include physical sensors 510. In various embodiments of the present invention, physical sensors 510 are multi-axis Micro-Electro-Mechanical Systems (MEMS) based devices being developed by M-cube, the assignee of the present patent application. Physical sensors 510 developed by M-cube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 510 are manufactured using a foundry-compatible process. As explained in such applications, because the process for manufacturing such physical sensors can be performed on a standard CMOS fabrication facility, it is expected that there will be a broader adoption of such components into computing device 400. In other embodiments of the present invention, conventional physical sensors 510 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 430 and driver 440 and inputs/or outputs to physical sensors 510 may be processed in parallel processing threads. In other embodiments, such events or outputs may be processed serially, or the like. Inputs and outputs from other functional blocks may also be processed in parallel or serially, in other embodiments of the present invention, such as image acquisition device 450 and physical sensors 510.

FIG. 3 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 400 may lack image acquisition unit 450, or RF interface 490 and/or driver 500, or GPS capability, or the like. Additional functions may also be added to various embodiments of computing device 400, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining an estimated user location, implemented in a computing system programmed to perform the method comprising:
    receiving, in the computer system, an indoor map database associated with an indoor geographic location including a plurality of indoor map features;
    determining, in the computer system, an estimated first user location within the indoor geographic location;
    receiving, in the computer system, a first plurality of physical perturbations from a plurality of physical sensors in response to the physical perturbations of the computer system;
    determining, in the computer system, an estimated second user location within the indoor geographic location in response to the estimated first user location and to the first plurality of physical perturbations;
    determining, in the computer system, a wander zone constraint in response to the first plurality of physical perturbations and the indoor geographic location, wherein the wander zone constraint is based on whether a user is positioned in an open indoor space within the indoor geographic location with a plurality of possible routes;
    determining, in the computer system, a modified estimated second user location in response to the estimated second user location and to at least one indoor map feature from the plurality of indoor map features while the wander zone constraint is inactive;
    determining, in the computer system a modified estimated second user location in response to the estimated second user location while deemphasizing the plurality of indoor map features while the wander zone constraint is active; and
    providing, in the computer system, an indication of the modified estimated second user location with regards to the indoor geographic location.

2. The method of claim 1 wherein providing, in the computer system, an indication of the modified estimated second user location comprises displaying, with the computer system, an icon superimposed upon a map on a display.

3. The method of claim 1 wherein determining, in the computer system, the first plurality of physical perturbations from the plurality of physical sensors comprises:

determining, in the computer system, lateral perturbations from an accelerometer; and determining, in the computer system, rotational perturbations from a gyroscope.

4. The method of claim 1 wherein determining, in the computer system, the first plurality of physical perturbations from the plurality of physical sensors comprises:

determining, in the computer system, magnetic field perturbations from a magnetometer.

5. The method of claim 1 wherein determining, in the computer system, the first plurality of physical perturbations from the plurality of physical sensors comprises:

determining, in the computer system, radio or satellite frequency perturbations from a receiver.

6. The method of claim 1 wherein a map feature of the plurality of map features is selected from a group consisting of: walls, obstacles, corridors, and routes.

7. The method of claim 6 wherein determining, in the computer system, the modified estimated second user location comprises biasing, in the computer system, the estimated second user location to form the modified estimated second user location in response to a location of the map feature.

8. The method of claim 6 wherein determining, in the computer system, the modified estimated second user location comprises:

determining, in the computer system, whether the estimated second user location violates a physical constraint associated with the map feature; and when the estimated second user location violates the physical constraint associated with the map feature, the method comprises determining, in the computer system, the modified estimated second user location in response to the estimated second user location and to the physical constraint associated with the map feature.

9. The method of claim 1 wherein the plurality of map features comprises a first map feature and a second map feature;

wherein the first map feature is associated with a first weighting factor;

wherein the second map feature is associated with a second weighting factor; and wherein determining, in the computer system, the modified estimated second user location comprises:

determining whether the estimated second user location is closer to a location of the first map feature or to a location of the second map feature;

wherein determining, in the computer system, the modified estimated second user location comprises biasing in the computer system, the estimated second user location to form the modified estimated second user location in response to the location of the first map feature and to the first weighting factor when the estimated second user location is closer to the location of the first map feature; and wherein determining, in the computer system, the modified estimated second user location comprises biasing in the computer system, the estimated second user location to form the modified estimated second user location in response to the location of the second map feature and to the second weighting factor when the estimated second user location is closer to the location of the second map feature.

10. The method of claim 9 wherein the second weighting factor is selected from a group consisting of: non-zero, zero.

11. A computer system programmed to determine and estimated use location comprising:

a memory for storing an indoor map database associated with an indoor geographic location including a plurality of indoor map features, and for storing an estimated first user location within the indoor geographic location;

a plurality of physical sensors for receiving physical perturbations of the computer system, and for determining a first plurality of physical perturbation in response to physical perturbations of the computing system; and a processor coupled to the memory and the plurality of physical sensors, wherein the processor is programmed for determining an estimated second user location within the indoor geographic location in response to the estimated first user location and to the first plurality of physical perturbations, wherein the processor is programmed for determining a wander zone constraint in response to the first plurality of physical perturbations and the indoor geographic location, the wander zone constraint being based on whether a user is positioned in an open indoor space within the indoor geographic location with a plurality of possible routes;

wherein the processor is programmed for determining a modified estimated second user location in response to the estimated second user location and to at least one indoor map feature from the plurality of map features while the wander zone constraint is inactive, wherein the processor is programmed for determining a modified estimated second user location in response to the estimated second user location while deemphasizing the plurality of indoor map features while the wander zone constraint is active, and wherein the processor is programmed for indicating the modified estimated second user location with regards to the indoor geographic location.

12. The computer system of claim 11 further comprising:

a display coupled to the processor; and wherein the processor is programmed for instructing the display to display an icon superimposed upon a map on the display in response to the modified estimated second user location and the geographic location.

13. The computer system of claim 11 wherein the plurality of physical sensors comprises an accelerometer for determining lateral perturbations;

and a gyroscope for determining rotational perturbations.

14. The computer system of claim 11 wherein the plurality of physical sensors comprises a magnetometer for determining magnetic field perturbations.

15. The computer system of claim 11 wherein the plurality of physical sensors comprises a radio or satellite frequency receiver for determining frequency perturbations.

16. The computer system of claim 11 wherein a map feature of the plurality of map features is selected form a group consisting of: walls, obstacles, corridors, and routes.

17. The computer system of claim 16 wherein the processor is programmed for biasing the estimated second user location to form the modified estimated second user location in response to a location of the map feature.

18. The computer system of claim 16 wherein the processor is programmed for determining whether the estimated second user location violates a physical constraint associated with the map feature; and wherein when the estimated second user location violates the physical constraint associated with the map feature, the processor is programmed for determining the modified estimated second user location in response to the estimated second user location and to the physical constraint associated with the map feature.

19. The computer system of claim 18 wherein the plurality of map features comprises a first map feature and a second map feature;

wherein the first map feature is associated with a first weighting factor;

wherein the second map feature is associated with a second weighting factor; and wherein the processor is programmed for determining whether the estimated second user location is closer to a location of the first map feature or to a location of the second map feature;

wherein when the estimated second user location is closer to the location of the first map feature, the processor is programmed for biasing the estimated second user location to form the modified estimated second user location in response to the location of the first map feature and to the first weighting factor; and wherein when the estimated second user location is closer to the location of the second map feature, the processor is programmed for biasing the estimated second user location to form the modified estimated second user location in response of the location of the second map feature and to the second weighting factor.

20. The computer system of claim 19 wherein the second weighting factor is selected from a group consisting of: non-zero, zero.

* * * * *